United States Patent

[11] 3,616,028

[72] Inventors Lewis S. Miller
 Bellevue, Wash.;
 Fraidoun Shafizadeh, Missoula, Mont.
[21] Appl. No. 628,297
[22] Filed Apr. 4, 1967
[45] Patented Oct. 26, 1971
[73] Assignee Weyerhaeuser Company
 Tacoma, Wash.

[54] PROCESS OF BONDING RESIN-IMPREGNATED OVERLAY MATERIAL TO A COATED SUBSTRATE MATERIAL UTILIZING HIGH-ENERGY RADIATION
 7 Claims, No Drawings

[52] U.S. Cl. .................................................. 156/272,
 156/310, 156/530, 156/332, 156/333, 161/250,
 161/270, 204/159, 204/22
[51] Int. Cl. .......................................................... B29c 19/02
[50] Field of Search ................................................. 156/272,
 310, 327, 333, 330, 332; 161/250, 270;
 204/159.22

[56] References Cited
UNITED STATES PATENTS

| | | | |
|---|---|---|---|
| 3,477,194 | 11/1969 | Corrsin | 156/272 X |
| 3,480,506 | 11/1969 | Hart et al. | 156/272 X |
| 2,903,546 | 9/1959 | O'Mara | 156/272 X |
| 3,081,244 | 3/1963 | Campanile | 156/272 UX |
| 3,137,633 | 6/1964 | Kline | 156/272 X |
| 3,146,146 | 8/1964 | Anderson | 156/272 |
| 3,179,546 | 4/1965 | Fischer | 156/272 |
| 3,424,638 | 1/1969 | Marans | 156/272 |

Primary Examiner—Benjamin R. Padgett
Assistant Examiner—Stephen J. Lechert, Jr.
Attorneys—Leslie G. Noller, John M. Crawford, Daniel C. Block, Patrick D. Coogan and Kenneth W. Vernon ABSTRACT: A method of simultaneously bonding and curing an impregnated overlay material of, particularly wood veneer, to a substrate material by thoroughly impregnating the overlay material with a polymerizable monomer or polymer dissolved in monomer, bringing the overly into contact with the substrate material previously coated on the surface to be contacted with a bonding material, and exposing the resulting product to high-energy radiation.

PROCESS OF BONDING RESIN-IMPREGNATED OVERLAY MATERIAL TO A COATED SUBSTRATE MATERIAL UTILIZING HIGH-ENERGY RADIATION

BACKGROUND OF THE INVENTION

In bonding natural wood veneer overlays to various substrate materials and in making decorative surfaces using paper overlays, it has been conventional practice to use impregnated veneers and impregnated paper. The impregnated wood and/or paper combination enhances both the wearing qualities and appearance of the finished products. Previously, for example, natural wood veneer overlays have been made by bonding a thin surfaced veneer to a substrate material by conventional means followed by coating the surface of the veneer with a clear finish. Another known method comprises impregnating veneer with a polymerizable monomer or monomer-polymer system, polymerizing or curing the wood-plastic combination by heat and catalyst or ionizing radiation, and bonding the hardened polymer-wood veneers to suitable substrates using conventional adhesives.

Products made in the manner described above require separate curing and bonding steps. In addition, veneers which are impregnated and then hardened prior to bonding become very brittle and difficult to handle without splitting.

SUMMARY

This invention contemplates a one-step method of bonding and hardening to a tack-free condition an impregnated overlay of paper or wood veneer to a substrate material in which the disadvantages of using precured or prepolymerized impregnated overlays are avoided. In addition, short curing and bonding times are achieved by the use of high-energy radiation, thus avoiding problems of absorption of the bonding material into the substrate material resulting in poor bonding, or migration of the polymer or monomer from the impregnated overlay. Also by using high-energy radiation high curing and/or polymerizing temperatures are avoided, thus alleviating some problems of polymer migration and absorption.

By this process, impregnated overlays can be bonded to various substrates for use in furniture, countertops, wall paneling, doors, and similar materials, in an easy and direct manner.

DETAILED DESCRIPTION

The process of this invention and materials which can be utilized in the process are discussed in further detail below.

Impregnation of wood and paper with various polymers and/or monomers can be accomplished in several different ways. When paper is used as the overlay material, impregnation of the paper is most easily accomplished by merely submerging the paper sheet in a bath of impregnant material for a suitable period of time. When using wood veneer as the overlay material, achieving complete impregnation of the wood by the impregnant is not quite as simple. Several methods have been developed for doing this, however, The extent to which a given piece of wood veneer will take up an impregnant is depended upon a number of variables, for example, the thickness of the wood, the species of wood, the viscosity of the polymer and/or monomer, and the moisture content of the wood. Two methods which may be used to impregnate wood veneer, for example, are (1) the vacuum-pressure technique and (2) the solvent-replacement technique. Referring to the first technique, air is removed from the wood cells and voids in the wood by placing the wood under vacuum for a suitable amount of time. The wood, while still under vacuum is then immerged in the impregnant and the atmosphere surrounding the immerged wood allowed to return to atmospheric pressure. The pressure exerted by the atmosphere helps force the impregnant into the cell structure of the wood material.

The second technique requires the stepwise replacement of the water in wood with the series of solvents of decreasing polarity, each miscible with the preceding solvent, until the solvent occupying the cells acts as a diffusion medium for the impregnant. An example of this technique can be found, for example, in the work of Kenaga Forest Products Journal, Volume 12 (4), pages 161–168, and U.S. Pat. Nos. 3,077,417; 3,077,418; and 3,077,419.

Any of the foregoing methods discussed for impregnating wood veneer or paper may be used in the process of this invention. It is important, when using wood veneer, that the veneer be thoroughly impregnated in order to achieve a commercially valuable product.

Liquids suitable for impregnation include those curable or polymerizable by high-energy radiation and, in the case of wood veneer, hose which have a viscosity suitable for impregnation. A number of commercially available materials curable or polymerizable by high-energy radiation are know, including the acrylic esters, di- or tri-methacrylates, epoxy acrylates, polyesters, and vinyl esters. These materials can be used in monomer form or as a solution of polymer in monomer. Mixtures of the particular materials may also be used. Specific impregnants which may be used include, for example, n-butyl acrylate, 2-hydroxyethyl acrylate, epoxy acrylates sold under the trade name Epocril by Shell Chemical Co.; vinyl ester resins sold under the trade name Derakane by Dow Chemical Co.; polyacrylates or methacrylates such as polymethyl methacrylate sold under the trade name Acryloid by Rohm & Haas Co., dissolved in compatible monomers.

After impregnation of the overlay material with the desired impregnant, the overlay is brought into intimate contact with a suitable substrate material previously coated on the surface to be contacted with a bonding material. Good contact between the overlay material and the substrate must be maintained to achieve adequate bonding. During the period of contact of the overlay with the substrate the laminated structure is exposed to high-energy radiation for a time sufficient to cure or polymerize both the impregnant and the bonding material. Some force may be needed to obtain adequate contact of the overlay material with the substrate, particularly when thick, stiff veneers are used as the overlay material. In such cases, pressures ranging from 50 to 200 p.s.i. may be used. Lower pressures such as 0 to 50 p.s.i. can be used when using thin flexible veneers or impregnated paper overlays. To prevent blocking of the radiation during contact of the overlay with the substrate material, a thin film vacuum bag may be placed over the surface of the overlay and vacuum applied in the conventional manner to press the overlay to the substrate. This technique is suitable for pressures up to about 15 p.s.i. Higher pressures can be achieved using a rigid grid or honeycomb which blocks little vertical radiation and which can be clamped or pressed on the overlay surface.

The bonding material coated on the substrate material should be a substance capable of being cured or polymerized by high-energy radiation and of sufficient viscosity to resist absorption into the substrate. The bonding material may be the same as the impregnant or it may be different. Suitable solutions of polymer in monomer which may be used include polyesters or solutions of polyacrylates, polymethacrylates, polyvinylchloride copolymers, or other compatible copolymers in acrylic or dimethacrylate monomers. To the monomer-polymer solution may be added extenders and inert fillers such as wood flour, bark, clay, protein flour or any of the other conventional inert fillers and extenders.

High-energy ionizing radiation, either particular or electromagnetic, may be employed to cure and/or polymerize the impregnant and bonding material. The emission of highly accelerated electrons or nuclear particles, such as protons, neutrons, alpha particles, deuterons, beta particles, directed at the overlay material, could be effective. These particles may be accelerated to high speeds by any number of known means, such as cyclotron or a Van de Graaff generator. The radiation should be sufficient to adequately cure and/or polymerize both the impregnant and the bonding material. The dose required is dependent, among other things, on the thickness of the overlay material and the type of monomer or polymer used. Dose rates up to 10 megarads per second may be used. In particular, when using electron beam radiation, dose rates ranging from 1 megarad per minute to 10 megarads per second may be employed. Effective results may be obtained using high-energy electrons of from 20,000 to 10,000,000 electron volts emitted from a Van de Graaff generator. Using dose rates of suitable intensity, times ranging from less than 1 second to about 20 seconds with essentially no temperature rise until polymerization is well along can be achieved. The low temperature rise is important in that migration of the polymer from the overlay material or the glue line is prevented. The process of this invention is normally carried out at or near ambient temperature. Lower or higher temperatures can be used to control reaction rate, viscosity, impregnation rate, and curing rate. Temperatures ranging from 0° to 100° C. are suitable.

Suitable overlay materials include various wood veneers and paper. Thin hardwood veneers ranging from about 5 to 50 mils are preferably used in the process of this invention although thicker veneers may be used provided suitable penetration of the high-energy radiation to cure or polymerize the materials can be achieved. Suitable wood veneers include, for example, those of birch, lauan mahogany, maple, red oak, hemlock, and walnut.

Any substrate material bondable by the aforementioned bonding materials can be used in this process. The substrate may be rigid or flexible and can include, for example, wood, hardboard, particleboard, metals, concrete, and plastics, such as phenolic or polyester laminates.

By the process of this invention, one-step curing and/or polymerization of thin overlay materials having the appearance of natural wood veneer and having wearing qualities much superior to normally finished wood, because of uniformity throughout the thickness of the overlay, can be achieved. The surfaces of the wood veneer overlays may be polished and used as is or with thin coatings of wax or other finish. The "in-depth" plastic finish resists indentation and allows defects to be removed by light sanding.

The following examples are given by way of illustration and not intended to be limiting in any manner. Unless otherwise indicated, references are to parts by weight.

EXAMPLE 1

A strip of birch veneer, 1.5×3×1/16 inch, was completely, immersed in tetraethylene glycol dimethacrylate for 2 hours, then placed on a piece of ½-inch Douglas fir plywood with sufficient monomer to wet the plywood surface. The veneer was covered with a sheet of 5 mils thick polyethylene terephthalate film then irradiated at a dose of 4 megarads by passing it under the electron beam of a Van de Graaff accelerator set at 1 mev., 0.1 ma. After polymerization and curing the polyester film was stripped away. The veneer had a clear, glossy plastic surface and was so tightly bonded to the plywood that it could not be wedged off without tearing the wood.

EXAMPLE 2

A 3.25×1.75×0.037 inch lauan mahogany veneer was evacuated to 0.5 mm. Hg pressure, then immersed in a solution of 77.5 percent tetraethylene glycol dimethacrylate, 17.5 percent hydroxyethyl acrylate and 5 percent water. This veneer was placed on a panel of Douglas fir plywood coated with a polyester resin sold under the trade name STYPOL-40-2224 by Matteson-Van Wey, Inc. containing 14 percent of an extender. After covering with a sheet of polyethylene terephthalate, the veneer surface was irradiated as in example 1 to a dose of 4 megarads. Again the veneer had a glossy surface and was well bonded.

EXAMPLE 3

Lauan veneer strips were impregnated as in example 2 with 40 percent ethylene glycol dimethacrylate, 20 percent 2-ethylhexyl acrylate and 40 percent 1,3-butylene dimethacrylate. These impregnated veneers were placed on the surface of Douglas fir plywood previously coated with a polyester resin sold under the trade name Paraplex P444 by Rohm & Haas Co. After covering with polyethylene terephthalate film, a grid of ¾×0.025 inch steel strips held in a vertical position was clamped over the surface to hold the veneer in intimate contact with the plywood. The veneer surface was then irradiated as before to a dose of 4 megarads. Again the veneer was well bonded and the surface was glossy and hard.

EXAMPLE 4

A 2.5×6×0.037 inch walnut veneer was impregnated as example 3 and placed on Douglas fir plywood coated with a polyester resin sold under the trade name Paraplex P444 by Rohm & Haas Co. A sheet of polyethylene terephthalate film was placed over the veneer and the whole specimen was placed in a shallow box covered with a film of polyethylene. On evacuating the box, the polyethylene film pressed on the top surface of the veneer, holding it firmly in place. While thus evacuated, the surface was irradiated as before at 4 megarads. Again the veneer surface was glossy and hard, the voids of the veneer were well filled with plastic, and the veneer was well bonded to the plywood.

EXAMPLE 5

A similarly prepared sample of birch veneer, both vacuum impregnated and bonded with a polyester resin sold under the trade name Paraplex P444 by Rohm & Haas Co., was exposed to 25 cycles consisting of 4 hours water soak 180° F. followed by 20 hours oven drying at 140° F. The bond showed no delamination.

EXAMPLE 6

The surface of a 6×9×½inch piece of Douglas fir plywood was first lightly wetted with 2-hydroxyethyl acrylate, then coated with a polyester resin consisting of a condensate of azelaic acid, propylene glycol, maleic acid and adipic acid diluted with 13 percent styrene and 13 percent methyl methacrylate. A 6×9 inch strip of 8 mil. printed saturating paper was soaked in 2-ethoxyethylacrylate and rolled onto the above polyester, covered with polyethylene terephthalate film and irradiated as in example 1 to a dose of 4 megarads. The overlay could not be peeled from the plywood and the overlay surface had excellent gloss and appearance after 500 hours exposure in a Weatherometer.

EXAMPLE 7

A strip of 1.5 mil bleached kraft paper tissue was rolled onto a 6×9×¼inch piece of birch-faced plywood previously surface coated with a solution of one part Paraplex P444 polyester resin (Rohm & Haas Co.) and one part Laminac EPX 126-11 polyester resin (American Cyanamid Co.) The paper was saturated and overcoated with the same resin mix, covered with a film of polyethylene terephthalate and irradiated as in example 1 to a dose of 4 megarads. The clear plywood surface had good resistance to abrasion and moisture.

It should be understood that the examples cited and the methods of procedures set forth are intended to be illustrative only and not intended to limit the scope of the invention.

What is claimed is:

1. A method of simultaneously bonding and curing an impregnated overlay material to a substrate material which comprises:
   a. impregnating the overlay material thoroughly with a high-energy radiation curable or polymerizable impregnant,
   b. bringing the impregnated overlay into intimate contact with a substrate material coated on the surface to be contacted with a bonding material curable or polymerizable by high-energy radiation and having a viscosity sufficient to prevent rapid absorption into the substrate, and
   c. while in intimate contact exposing the resultant product to sufficient high-energy radiation to bond the overlay material to the substrate, cure said impregnant, and form on the surface of the overlay a solid polymer coating.

2. Method according to claim 1 wherein the impregnant is selected from the group consisting of acrylate esters, unsaturated polyesters, and vinyl esters.

3. Method according to claim 1 wherein the bonding material is the same as the impregnant.

4. Method according to claim 1 wherein the high-energy radiation ranges from about 20,000 to 10,000,000 electron volts.

5. Method according to claim 1 wherein the overlay is wood veneer.

6. Method according to claim 1 wherein the overlay is paper.

7. A method of simultaneously bonding and curing an impregnated wood veneer overlay to a substrate material which comprises:
   a. impregnating a wood veneer having a thickness ranging from 5 to 50 mils with an impregnant selected from the group consisting of acrylate esters, unsaturated polyesters, and vinyl esters,
   b. bringing the impregnated veneer into contact with a substrated material coated on the surface to be contacted with a bonding material curable or polymerizable by high-energy radiation and having a viscosity sufficient to prevent rapid absorption into the substrate material, the contact pressure ranging from about 10 to 200 p.s.i. and deployed in a way so as not to block high-energy radiation directed at the substrate and overlay, and while under pressure,
   c. exposing the resulting product to high-energy electrons ranging from 20,000 to 10,000,000 electron volts to bond the veneer overlay to the substrate material, cure said impregnant, and form on the overlay surface a solid polymer coating.